United States Patent
Kawaguchi et al.

(10) Patent No.: US 11,395,067 B2
(45) Date of Patent: Jul. 19, 2022

(54) MICROPHONE-LOUDSPEAKER INTEGRATED APPARATUS AND VEHICLE

(71) Applicants: TOYOTA JIDOSHA KABUSHIKI KAISHA, Toyota (JP); DENSO CORPORATION, Kariya (JP); YAMAHA CORPORATION, Hamamatsu (JP)

(72) Inventors: Keizoh Kawaguchi, Toyota (JP); Ichiro Shigetomi, Kariya (JP); Kunito Takahashi, Hamamatsu (JP)

(73) Assignees: TOYOTA JIDOSHA KABUSHIKI KAISHA, Toyota (JP); DENSO CORPORATION, Kariya (JP); YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 16/982,387

(22) PCT Filed: Mar. 18, 2019

(86) PCT No.: PCT/IB2019/000166
§ 371 (c)(1),
(2) Date: Sep. 18, 2020

(87) PCT Pub. No.: WO2019/180501
PCT Pub. Date: Sep. 26, 2019

(65) Prior Publication Data
US 2021/0006904 A1    Jan. 7, 2021

(30) Foreign Application Priority Data

Mar. 20, 2018    (JP) .............................. JP2018-053499

(51) Int. Cl.
*H04R 5/04* (2006.01)
*B60R 11/02* (2006.01)
(Continued)

(52) U.S. Cl.
CPC ............ *H04R 5/04* (2013.01); *B60R 11/0217* (2013.01); *B60R 11/0247* (2013.01);
(Continued)

(58) Field of Classification Search
CPC .......... H04R 5/04; H04R 1/406; H04R 3/005; H04R 29/005; H04R 3/04; H04R 3/02;
(Continued)

(56) References Cited

U.S. PATENT DOCUMENTS

| 5,121,426 A | 6/1992 | Baumhauer, Jr. et al. |
| 2008/0205665 A1 | 8/2008 | Tokuda et al. |

(Continued)

FOREIGN PATENT DOCUMENTS

| CN | 101803402 A | 8/2010 |
| EP | 2 192 791 A1 | 6/2010 |

(Continued)

OTHER PUBLICATIONS

International Search Report dated May 31, 2019 in PCT/IB2019/000166 filed on Mar. 18, 2019.

*Primary Examiner* — Yogeshkumar Patel
(74) *Attorney, Agent, or Firm* — Oblon, McClelland, Maier & Neustadt, L.L.P.

(57) ABSTRACT

A microphone-loudspeaker integrated apparatus includes a plurality of microphones, a loudspeaker, and a synthesis unit. The loudspeaker is disposed between the plurality of microphones. The synthesis unit synthesizes sounds collected from the plurality of microphones. A distance between the plurality of microphones is set so as to fall within a range within which sound at a frequency needed for recognizing voice is collectable and within a range within which a noise amount due to vibration of the loudspeaker is allowable, when voice recognition is performed based on sound obtained through synthesis by the synthesis unit.

7 Claims, 2 Drawing Sheets

(51) Int. Cl.
*G10L 15/00* (2013.01)
*H04R 3/00* (2006.01)

(52) U.S. Cl.
CPC .............. *G10L 15/00* (2013.01); *H04R 3/005* (2013.01); *H04R 2499/13* (2013.01)

(58) Field of Classification Search
CPC .......... H04R 2499/13; H04R 2201/403; B60R 11/0217; B60R 11/0247; G10L 15/00
See application file for complete search history.

(56) References Cited

U.S. PATENT DOCUMENTS

| | | | |
|---|---|---|---|
| 2010/0208907 A1* | 8/2010 | Ukai | ........................ H04R 3/02 381/66 |
| 2015/0016642 A1* | 1/2015 | Walsh | .................... H04S 7/301 381/307 |
| 2016/0129839 A1 | 5/2016 | Kim | |
| 2020/0077214 A1* | 3/2020 | Yuzuriha | ................ H04R 3/005 |

FOREIGN PATENT DOCUMENTS

| | | | |
|---|---|---|---|
| JP | 3-117148 A | | 5/1991 |
| JP | 4-318798 A | | 11/1992 |
| JP | 2004-282157 A | | 10/2004 |
| JP | 2004282157 A | * | 10/2004 |
| JP | 2005-164988 A | | 6/2005 |
| JP | 2005-247181 A | | 9/2005 |
| JP | 2006-238148 A | | 9/2006 |
| JP | 2007-282166 A | | 10/2007 |
| JP | 2017-174120 A | | 9/2018 |
| KR | 10-2017-0082171 A | | 7/2017 |

\* cited by examiner

MICROPHONE-LOUDSPEAKER INTEGRATED APPARATUS AND VEHICLE

BACKGROUND OF THE INVENTION

1. Field of the Invention

The present invention relates to a microphone-loudspeaker integrated apparatus and a vehicle.

2. Description of Related Art

There is conventionally a vehicle including an emergency call system which performs an emergency call to an emergency call center in an emergency such as a crash of the vehicle. Japanese Patent Application Publication No. 2017-174120 discloses an emergency call system which securely mutes a voice output which disturbs speech communication at an emergency call and which enables the voice output of an in-vehicle loudspeaker to be resumed after the completion of the emergency call in the case of a manual emergency call.

SUMMARY OF THE INVENTION

In the emergency call system of JP 2017-174120 A, the positions of a microphone and a loudspeaker are fixed. However, if quality of sound collected by the microphone is wanted to be secured for each vehicle, tuning is needed for each vehicle type and each grade of audio equipment, which causes increase of evaluation steps, components and the like and a factor of high costs of the vehicle.

The present invention provides a microphone-loudspeaker integrated apparatus and a vehicle capable of securing quality of sound collected by a microphone with a simple configuration.

A microphone-loudspeaker integrated apparatus according to a first aspect of the present invention includes: a plurality of microphones; a loudspeaker; and a synthesis unit. The loudspeaker is disposed between the plurality of microphones. The synthesis unit synthesizes sounds collected from the plurality of microphones. A distance between the plurality of microphones is set so as to fall within a range within which sound at a frequency needed for recognizing voice is collectable and within a range within which a noise amount due to vibration of the loudspeaker is allowable, when voice recognition is performed based on sound obtained through the synthesis by the synthesis unit.

In the aforementioned microphone-loudspeaker integrated apparatus, the plurality of microphones may have a relation that as the distance between the microphones becomes greater, a maximum frequency at which sound is collectable with recognizable quality decreases, and that the noise amount due to the vibration of the loudspeaker decreases.

The aforementioned microphone-loudspeaker integrated apparatus may further include an adjustment unit configured to adjust the distance between the microphones.

In the aforementioned microphone-loudspeaker integrated apparatus, the plurality of microphones may be two microphones.

An second aspect of the present invention is a vehicle that includes the microphone-loudspeaker integrated apparatus being attached at a predetermined position of an overhead console of the vehicle.

According to the aforementioned configuration, quality of sound collected by a microphone can be secured with a simple configuration.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
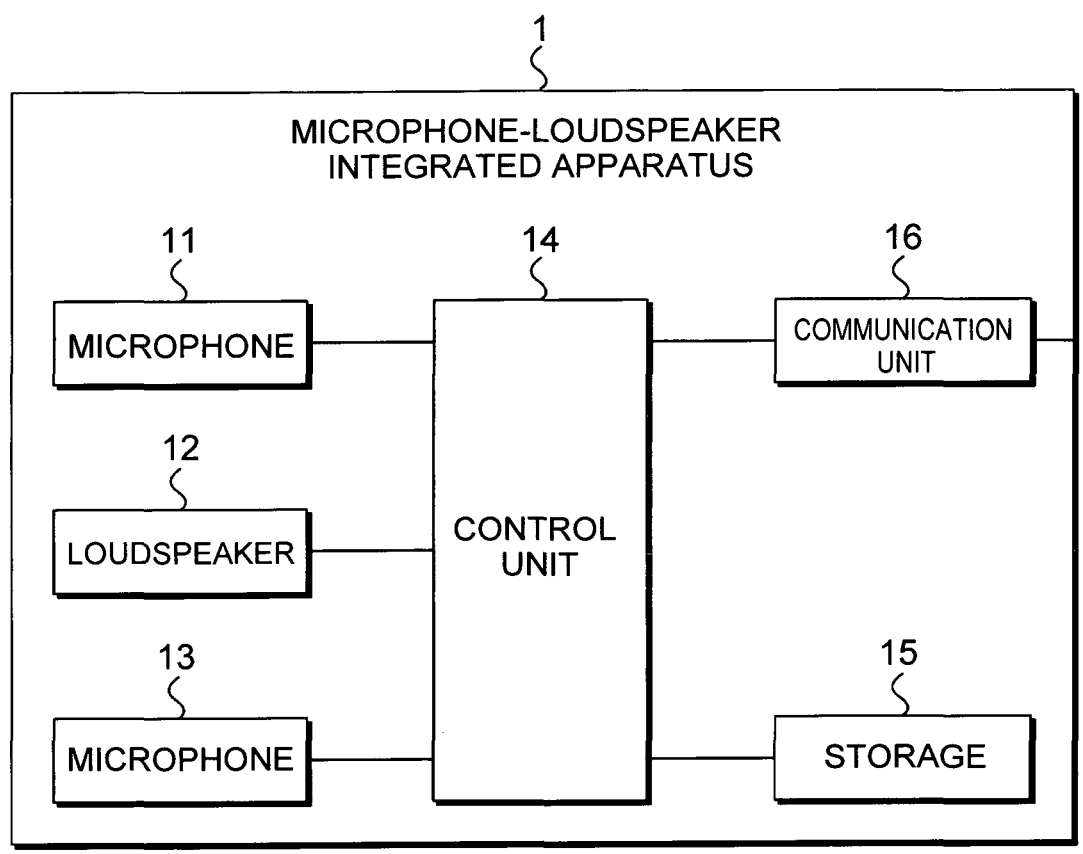
FIG. 1 is a diagram exemplarily showing a configuration of a microphone-loudspeaker integrated apparatus according to an embodiment.

Preferred embodiments of the present invention are described with reference to the attached drawings. Notably, in the drawings, the same numerals denote the same or similar configurations.

A configuration of a microphone-loudspeaker integrated apparatus according to an embodiment is described with reference to FIG. 1. A microphone-loudspeaker integrated apparatus 1 can be used, for example, for a user interface in providing service through voice recognition or for a user interface of an emergency call system. Herein, the voice recognition includes voice recognition by a person (for example, an operator in an emergency call center) as well as voice recognition by a machine.

For example, the microphone-loudspeaker integrated apparatus 1 is used by being attached at a predetermined position of an overhead console mounted on a vehicle (automobile). The overhead console is a console, for a front seat, disposed in a center part of the ceiling of the vehicle, and, for example, a map lamp, a clock and an accessory case are provided therein. By attaching the microphone-loudspeaker integrated apparatus 1 to the overhead console, an echo path can be fixed, and acoustic quality parameters can be standardized.

As shown in FIG. 1, for example, the microphone-loudspeaker integrated apparatus 1 includes two microphones 11, 13, a loudspeaker 12 disposed between the two microphones, a control unit 14 which is a calculation apparatus such as a CPU, a storage 15 which is a storage apparatus such as a memory, and a communication unit 16 which is a communication interface controlling communication with other apparatuses. The control unit 14 has, for example, a function as a synthesis unit which synthesizes (adds and/or subtracts) sounds collected from the two microphones 11, 13, and a function as a voice recognition unit which performs voice recognition based on a sound (signal) obtained through the synthesis.

For example, the microphone-loudspeaker integrated apparatus 1 has the following characteristics. As the distance between the microphone 11 and the microphone 13 becomes greater, the maximum frequency of sound collected by the microphones 11, 13 decreases. When the maximum frequency of sound collected decreases, this causes a factor of deterioration of voice recognition performance. On the other hand, as the distance between the microphone 11 and the microphone 13 becomes shorter, noise (vibration sound) due to the vibration of the loudspeaker 12 existing between the microphones is collected by the microphone 11 and the microphone 13, and the noise amount increases. Such increase of the noise amount causes a factor of occurrence of an echo.

Relations between the distance between the microphones and the maximum frequency of sound collected by the microphones or the noise amount due to the vibration of the loudspeaker are described with reference to FIG. 2.

Figure 2:
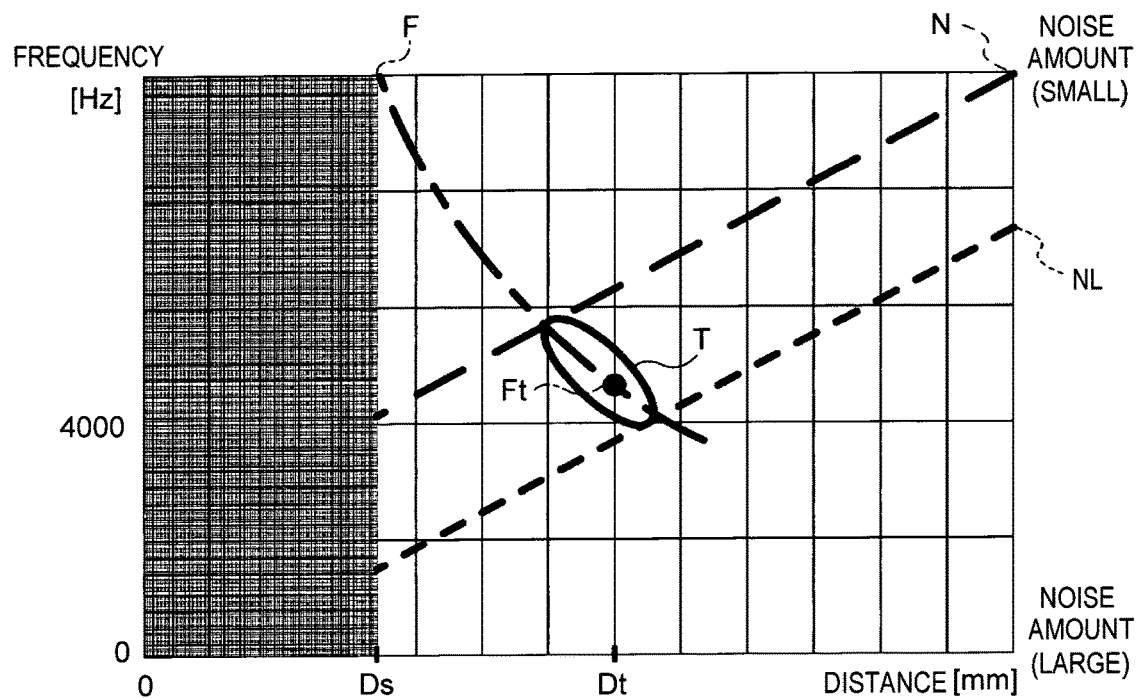
FIG. 2 shows graphs representing relations between the distance between microphones and a maximum frequency at which sound is collectable or a noise amount due to vibration of a loudspeaker.

The horizontal axis in FIG. 2 denotes the distance [mm] between the microphone 11 and the microphone 13. The vertical axis on the left side denotes the maximum frequency [Hz] of sound collected by the two microphones 11, 13. The vertical axis on the right side denotes the noise amount due to the vibration, of the loudspeaker 12, collected by the two microphones 11, 13. A distance Ds exemplarily presents the diameter of the loudspeaker 12 disposed between the two microphones 11, 13. A distance Dt exemplarily presents the distance between the two microphones 11, 13.

A graph F presents ideal values in relation between the distance between the two microphones 11, 13 and the maximum frequency of sound collected by the two microphones 11, 13. As presented by the graph F, the microphone 11 and the microphone 13 have a relation that as the distance between the two microphones 11, 13 becomes greater, the maximum frequency of sound collected decreases.

A graph N presents ideal values in relation between the distance between the two microphones 11, 13 and the noise amount due to the vibration, of the loudspeaker 12, collected by the two microphones 11, 13. A graph NL presents lower limit values in relation between the distance between the two microphones 11, 13 and the noise amount due to the vibration, of the loudspeaker 12, collected by the two microphones 11, 13 in the case of considering physical characteristics.

As presented by the graphs N and NL, the microphone 11 and the microphone 13 have a relation that as the distance between the two microphones 11, 13 becomes greater, the noise amount due to the vibration of the loudspeaker 12 decreases.

Now, in order to enhance voice recognition performance, the maximum frequency of sound collected by the microphones is preferably secured to be 4000 [Hz] or more. Accordingly, in FIG. 2, within the graph F, a range within which the frequency is 4000 [Hz] or more and which is interposed between the graph N and the graph NL is set to be a target range T in setting the distance between the two microphones 11, 13.

By setting the distance between the two microphones 11, 13 so as to fall within the target range T, when voice recognition is performed based on sound collected by the two microphones 11, 13, the distance between the microphones can be set so as to fall within a range within which sound at the frequency needed for recognizing voice is collectable and within a range within which a noise amount due to vibration of the loudspeaker is allowable.

The graphs presented in FIG. 2 exemplarily shows that a distance Dt corresponding to point Ft on the graph F within the target range T is selected as the distance between the two microphones 11, 13.

The two microphones 11, 13 included in the microphone-loudspeaker integrated apparatus 1 are disposed such that the distance between the microphones 11, 13 is the distance Dt.

As mentioned above, according to the microphone-loudspeaker integrated apparatus 1 according to an embodiment, as to the two microphones 11, 13, the distance between the microphones is set so as to fall within a range within which sound at the frequency needed for recognizing voice is collectable and within a range within which a noise amount due to vibration of the loudspeaker 12 disposed between the two microphones 11, 13 is allowable, when voice recognition is performed based on a sound obtained by synthesizing sounds collected by the two microphones 11, 13.

Thus, by setting the distance between the two microphones 11, 13 disposed to sandwich the loudspeaker 12, sound which includes the frequency needed for recognizing voice and which includes small noise can be collected. Hence, quality of sound collected by the microphones can be secured with a simple configuration, and accuracy of voice recognition can also be improved.

Modification

Notably, the present invention is not limited to the aforementioned embodiment but can be implemented in various other forms without departing from the spirit of the present invention. Accordingly, the aforementioned embodiment is merely exemplary in all respects and is not limitedly construed.

Figure 3:
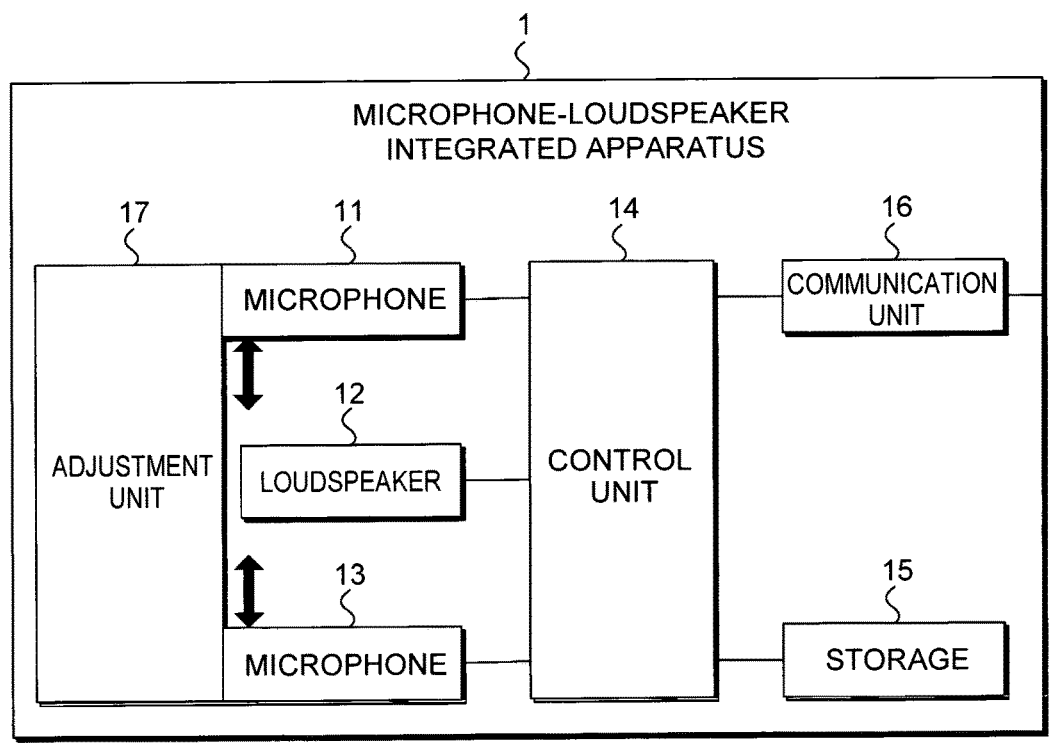
FIG. 3 is a diagram exemplarily showing a configuration of a microphone-loudspeaker integrated apparatus according to a modification.

For example, the configuration of the aforementioned microphone-loudspeaker integrated apparatus 1 according to an embodiment is not limited to the configuration shown in FIG. 1. For example, as shown in FIG. 3, the microphone-loudspeaker integrated apparatus 1 may further include an adjustment unit 17. The adjustment unit 17 is an adjustment mechanism for adjusting the distance between the microphone 11 and the microphone 13. For example, by moving the microphones 11, 13 along the adjustment unit 17 in the direction of the arrows in the figure, the distance between the microphone 11 and the microphone 13 can be adjusted. Thereby, the distance between the microphone 11 and the microphone 13 can be mechanically adjusted using the adjustment mechanism.

Moreover, while in the aforementioned embodiment, the microphone-loudspeaker integrated apparatus 1 includes the two microphones 11, 13, the microphone-loudspeaker integrated apparatus 1 may include three or more microphones. When the microphone-loudspeaker integrated apparatus 1 includes three or more microphones, loudspeakers 12 are disposed between the microphones. Each distance between the microphones are set so as to fall within a range within which sound at the frequency needed for recognizing voice is collectable and within a range within which a noise amount due to vibration of the loudspeaker 12 is allowable, when voice recognition is performed based on sound collected by the microphones.

The invention claimed is:

1. A microphone-loudspeaker integrated apparatus comprising:
   a plurality of microphones;
   a loudspeaker disposed between two microphones of the plurality of microphones; and
   a synthesis unit that synthesizes sounds collected from the plurality of microphones, wherein
   a distance between the plurality of microphones is set so as to fall within a range within which a maximum frequency of sound needed for recognizing voice is greater than a predetermined frequency and within a range within which a noise amount due to vibration of the loudspeaker is less than a predetermined noise limit, when voice recognition is performed based on sound obtained through synthesis by the synthesis unit, and the microphone-loudspeaker integrated apparatus is used in a state in which the microphone-loudspeaker integrated apparatus is attached at a predetermined position of an overhead console of a vehicle.

2. The microphone-loudspeaker integrated apparatus according to claim 1, wherein the plurality of microphones have a relation that as the distance between the microphones becomes greater, a maximum frequency at which sound is collectable with recognizable quality decreases, and that the noise amount due to the vibration of the loudspeaker decreases.

3. The microphone-loudspeaker integrated apparatus according to claim 1, further comprising an adjustment unit configured to adjust the distance between the microphones.

4. The microphone-loudspeaker integrated apparatus according to claim 1, wherein the plurality of microphones are two microphones.

5. A vehicle comprising:

a microphone-loudspeaker integrated apparatus being attached at a predetermined position of an overhead console of the vehicle, wherein the microphone-loudspeaker integrated apparatus includes:

a plurality of microphones, a loudspeaker disposed between two microphones of the plurality of microphones, and a synthesis unit that synthesizes sounds collected from the plurality of microphones, wherein a distance between the plurality of microphones is set so as to fall within a range within which a maximum frequency of sound needed for recognizing voice is greater than a predetermined frequency and within a range within which a noise amount due to vibration of the loudspeaker is less than a predetermined noise limit, when voice recognition is performed based on sound obtained through synthesis by the synthesis unit.

6. The microphone-loudspeaker integrated apparatus according to claim 1, wherein the distance between the plurality of microphones is greater than a diameter of the loudspeaker.

7. The vehicle according to claim 5, wherein the distance between the plurality of microphones is greater than a diameter of the loudspeaker.

* * * * *